US012782515B2

(12) United States Patent
Han

(10) Patent No.: US 12,782,515 B2
(45) Date of Patent: Nov. 3, 2026

(54) LiDAR APPARATUS

(71) Applicant: HL KLEMOVE CORP., Incheon (KR)

(72) Inventor: HakGu Han, Gyeonggi-do (KR)

(73) Assignee: HL KLEMOVE CORP., Incheon (KR)

( * ) Notice: Subject to any disclaimer, the term of this patent is extended or adjusted under 35 U.S.C. 154(b) by 952 days.

(21) Appl. No.: 18/077,229

(22) Filed: Dec. 8, 2022

(65) Prior Publication Data

US 2023/0176195 A1 Jun. 8, 2023

(30) Foreign Application Priority Data

Dec. 8, 2021 (KR) ........................ 10-2021-0174813

(51) Int. Cl.

*G01S 7/481* (2006.01)
*G01S 17/89* (2020.01)
*G01S 17/931* (2020.01)
*G02B 5/20* (2006.01)

(52) U.S. Cl.

CPC ............ *G01S 7/4814* (2013.01); *G01S 17/89* (2013.01); *G01S 17/931* (2020.01); *G02B 5/208* (2013.01)

(58) Field of Classification Search

CPC ........ G02B 5/208; G02B 1/115; G02B 5/003; G02B 5/22; G02B 1/10; G02B 1/11; G02B 19/0076

See application file for complete search history.

(56) References Cited

U.S. PATENT DOCUMENTS

| | | | | |
|---|---|---|---|---|
| 11,874,478 | B1 * | 1/2024 | Mudge | G01S 17/08 |
| 2020/0264283 | A1 * | 8/2020 | Fu | G01S 7/4876 |
| 2023/0184908 | A1 * | 6/2023 | Verghese | G01S 7/4868<br>701/23 |

FOREIGN PATENT DOCUMENTS

| | | |
|---|---|---|
| CN | 103688145 | 3/2014 |
| CN | 113050212 | 6/2021 |
| CN | 213581331 | 6/2021 |
| KR | 10-2007-0087238 | 8/2007 |
| KR | 10-1899549 | 9/2018 |
| KR | 10-2019-0032813 | 3/2019 |
| KR | 10-2019-0055267 | 5/2019 |
| KR | 10-2019-0091593 | 8/2019 |

OTHER PUBLICATIONS

Hyperphysics, "Multi-Layer Anti-Reflection Coatings", 2018 (Year: 2018).*

Office Action dated Aug. 3, 2023 for Korean Patent Application No. 10-2021-0174813 and its English translation by Google Translate.

Office Action dated Jun. 30, 2025 for Chinese Patent Application No. 202211563515.3 and its English translation from Global Dossier.

* cited by examiner

*Primary Examiner* — Isam A Alsomiri
*Assistant Examiner* — Joseph C Fritchman
(74) *Attorney, Agent, or Firm* — WOMBLE BOND DICKINSON (US) LLP

(57) ABSTRACT

Disclosed is a light detection and ranging (LiDAR) apparatus capable of further reducing scattered light generated in a process of transmitting or receiving light waves. The LiDAR apparatus includes a transmitter and a receiver, wherein at least one of the transmitter and the receiver includes an absorbing coating layer that is formed of an absorbent material, which absorbs energy of laser light, and with which an interface of a lens, on which the laser light is incident, is coated.

8 Claims, 6 Drawing Sheets

【Fig. 1】
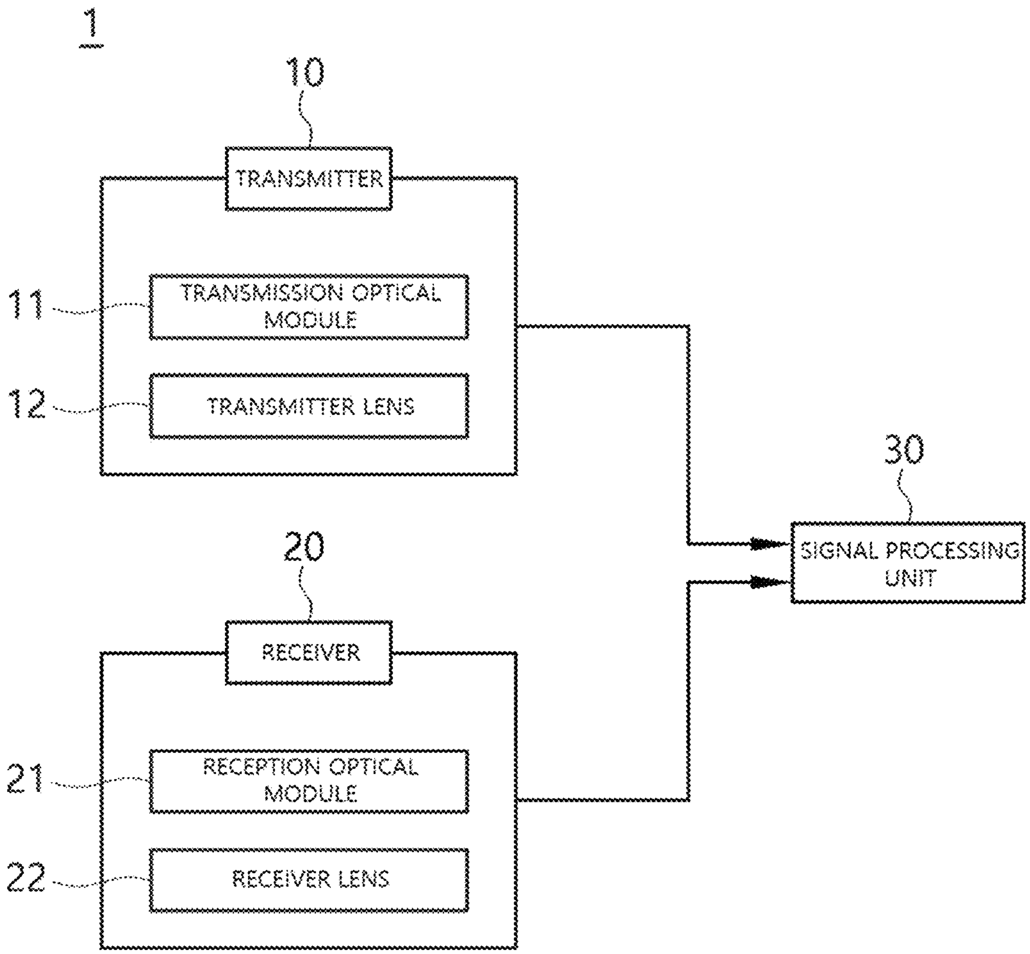

【Fig.2】
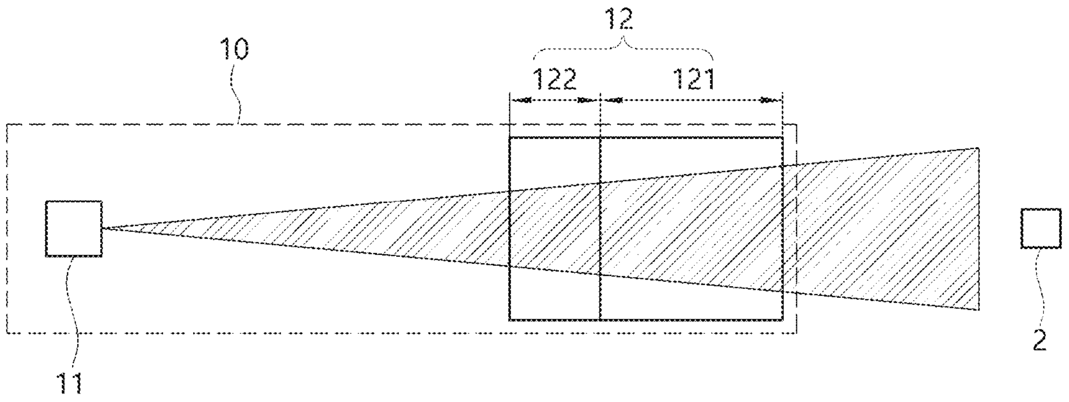

【Fig.3】
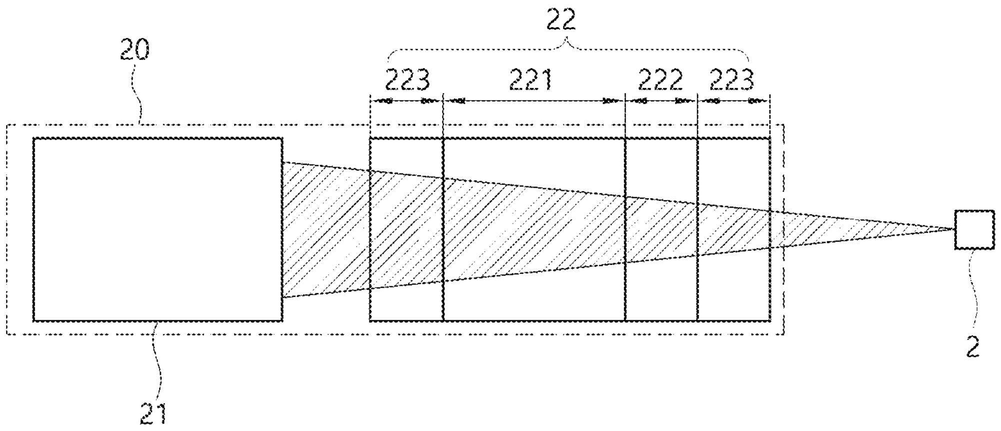

【Fig.4】
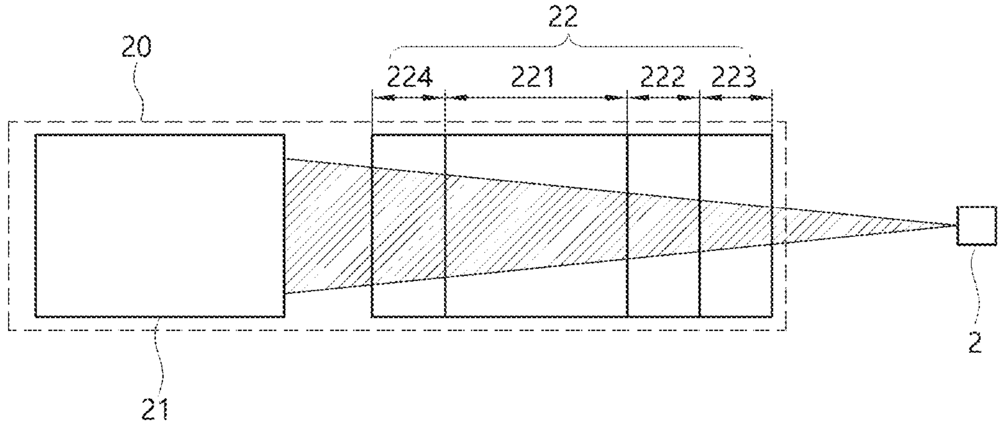

【Fig.5】
(a)
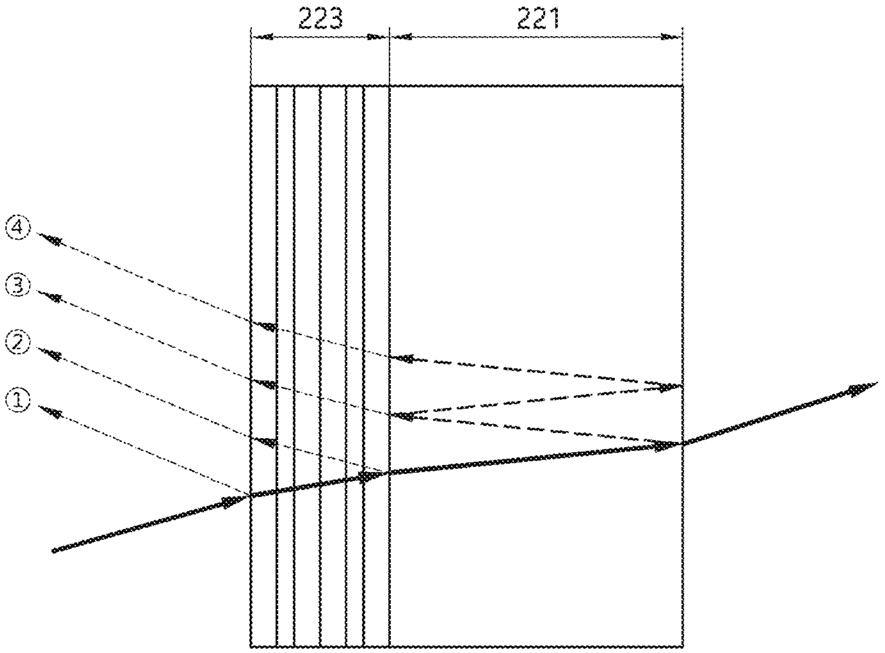
(b)
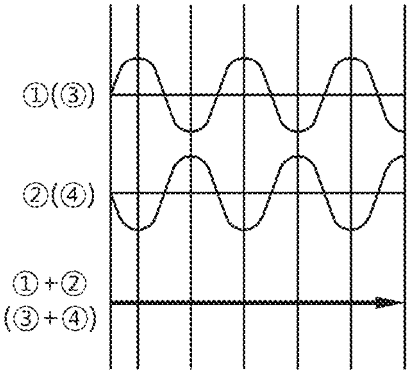

【Fig.6】
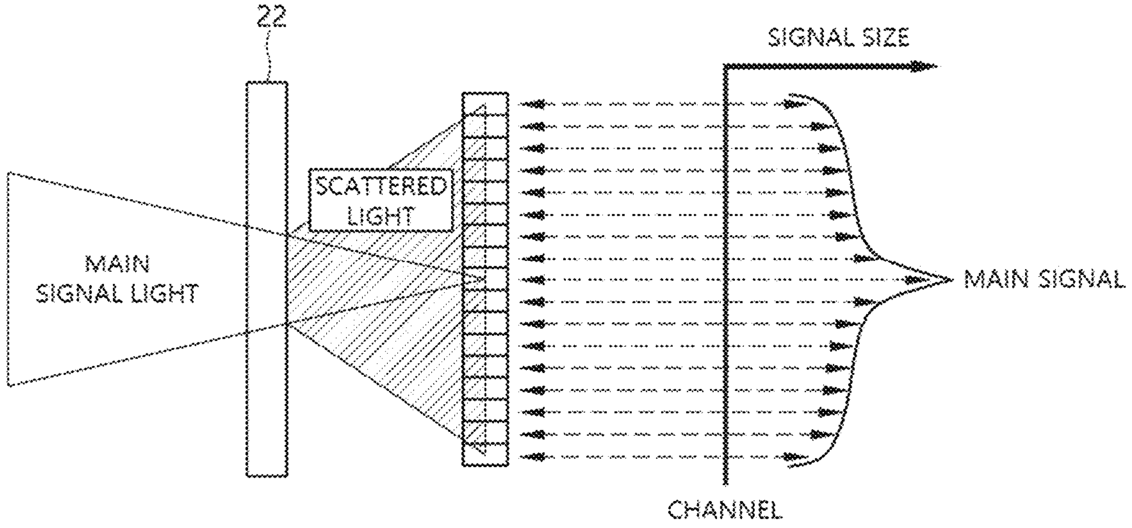
(a)
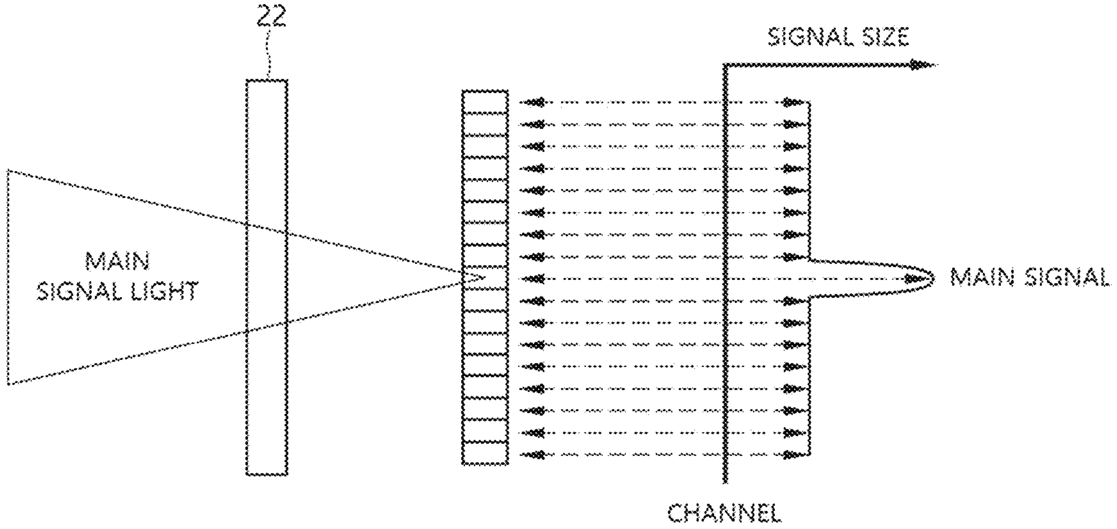
(b)

LiDAR APPARATUS

CROSS-REFERENCE TO RELATED APPLICATION

This application claims priority to and the benefit of Korean Patent Application No. 10-2021-0174813, filed on Dec. 8, 2021, the disclosure of which is incorporated herein by reference in its entirety.

BACKGROUND

1. Field of the Invention

The present invention relates to a light detection and ranging (LiDAR) apparatus, and more particularly, to a LiDAR apparatus capable of further reducing scattered light generated in a process of transmitting or receiving light waves.

2. Discussion of Related Art

A light detection and ranging (LiDAR) apparatus is an apparatus that emits laser light, receives light reflected back from a nearby target object, and images a distance to the object and a shape of the object.

A LiDAR apparatus includes a transmitter that emits laser light and a receiver that receives light reflected back from a target object. Each of the transmitter and the receiver includes a lens, and the laser light is transmitted through the lens of the transmitter, reaches the target, is then reflected by the target object, is transmitted through the lens of the receiver, and returned back.

In the process in which the laser light is transmitted through the transmitter and the lens of the receiver, some laser light is reflected and the remaining laser light is transmitted without reflection. In the above process, a phenomenon in which the laser light is scattered may occur.

The scattered light may cause an increase in minimum detection distance to a target object or a decrease in maximum detection distance to the target object, and may adversely affect the performance of the LiDAR apparatus, such as reduction of detection accuracy or the like.

Therefore, development of a LiDAR apparatus capable of further reducing scattered light generated in a process of transmitting or receiving light waves such as laser light or the like is required.

In Korean Patent Registration No. 10-1899549, an obstacle recognition apparatus using a camera and a LiDAR sensor is disclosed. Specifically, an obstacle recognition apparatus for improving a recognition rate of an object in front of a vehicle using synchronization of a camera and a LiDAR sensor is disclosed.

However, for this type of LiDAR sensor, a solution to a problem of performance degradation caused by scattered light is not disclosed.

In Korean Unexamined Patent Application Publication No. 10-2019-0032813, a light-receiving lens module and LiDAR are disclosed. Specifically, a light-receiving lens module and LiDAR in which light-receiving efficiency can be increased at a wide angle are disclosed.

However, with this type of LiDAR sensor, since the light-receiving efficiency is increased by changing a path of incident light, there is a limit to which it can fundamentally solve the generation of scattered light.

DOCUMENT OF RELATED ART

Patent Document

Korean Patent Registration No. 10-1899549 (published on Sep. 17, 2018)

Korean Unexamined Patent Application Publication No. 10-2019-0032813 (published on Mar. 28, 2019)

SUMMARY OF THE INVENTION

The present invention is directed to solving the above problems by providing a light detection and ranging (LiDAR) apparatus capable of further reducing scattered light of light waves transmitted through a lens of a transmitter or a receiver.

The present invention is also directed to solving the above problems by providing a LiDAR apparatus capable of further improving a maximum detection distance.

The present invention is also directed to solving the above problems by providing a LiDAR apparatus capable of further reducing an effect of a change in the angle of incidence of light waves transmitted through a transmitter or a receiver.

The present invention is also directed to solving the above problems by providing a LiDAR apparatus capable of processing more signals.

The present invention is also directed to solving the above problems by providing a LiDAR apparatus in which a lens design is easier.

According to an aspect of the present invention, there is provided a LiDAR apparatus including a transmitter including a transmission optical module that emits laser light toward a detection target, and a transmitter lens through which the laser light emitted from the transmission optical module is transmitted, and a receiver configured to receive laser light reflected back from the detection target, wherein the transmitter lens includes a transmitter glass, and a transmitter absorbing coating layer that is formed of an absorbent material, which absorbs energy of the laser light, and with which one surface of the transmitter glass is coated.

The transmitter absorbing coating layer may be disposed adjacent to one surface of the transmitter glass facing the transmission optical module.

A cross-sectional area of the transmitter absorbing coating layer in a traveling direction of the laser light may be identical to or larger than a transmission area of the laser light.

A central part of the transmitter absorbing coating layer may be positioned on an imaginary line that connects a starting point of the laser light to a central part of the transmitter glass.

According to another aspect of the present invention, there is provided a LiDAR apparatus including a transmitter configured to emit laser light toward a detection target, and a receiver including a receiver lens through which laser light reflected back from the detection target is transmitted, and a reception optical module configured to receive the laser light passing through the receiver lens, wherein the receiver lens includes a receiver glass, and a receiver absorbing coating layer that is formed of an absorbent material, which absorbs energy of the laser light, and with which one surface of the receiver glass facing the detection target is coated.

The receiver absorbing coating layer may be disposed adjacent to one surface of the receiver glass facing the detection target.

An anti-reflecting (AR) coating layer composed of a plurality of layers having a refractive index that is greater than 1 and smaller than a refractive index of the receiver glass may be disposed on one side of the receiver lens.

The AR coating layer may be disposed on one surface of the receiver absorbing coating layer facing the detection target.

The AR coating layer may be disposed on one surface of the receiver glass facing the reception optical module.

A bandpass filter that is formed of an absorbent material that absorbs energy of the laser light, and transmits only light waves within a preset wavelength range may be disposed on one surface of the receiver glass facing the reception optical module.

The receiver may include a bandpass filter that is disposed on one side of the receiver facing the detection target, formed of an absorbent material that absorbs energy of the laser light, and transmits only light waves within a preset wavelength range.

The preset wavelength range may be 200 nm or more and 1,200 nm or less.

A cross-sectional area of the bandpass filter in a traveling direction of the laser light may be identical to or larger than a transmission area of the laser light.

The bandpass filter can have a central part positioned on an imaginary line that connects the detection target to a central part of the receiver glass.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 1 is a schematic diagram illustrating a light detection and ranging (LiDAR) apparatus according to an embodiment of the present invention;

FIG. 2 is a schematic diagram illustrating a transmitter provided in the LiDAR apparatus of FIG. 1;

FIG. 3 is a schematic diagram illustrating a receiver provided in the LiDAR apparatus of FIG. 1;

FIG. 4 is a schematic diagram illustrating another example of the receiver of FIG. 3;

FIG. 5 is a set of schematic diagrams illustrating light waves transmitted through an anti-reflecting (AR) coating layer provided in the receiver of FIG. 3; and FIG. 6 is a set of schematic diagrams illustrating light waves transmitted through a receiver lens provided in the receiver of FIG. 3.

DETAILED DESCRIPTION OF EXEMPLARY EMBODIMENTS

Hereinafter, a light detection and ranging (LiDAR) apparatus 1 according to embodiments of the present invention will be described in more detail with reference to the accompanying drawings.

In the following description, in order to clarify features of the present invention, description of some components may be omitted.

In this specification, the same reference numerals are assigned to the same components even in different embodiments, and description thereof will not be repeated.

The accompanying drawings are only for easy understanding of embodiments disclosed in this specification, and the technological scope disclosed in this specification is not limited to the accompanying drawings.

The singular forms "a" and "an" are intended to include the plural forms as well, unless the context clearly indicates otherwise.

Hereinafter, the LiDAR apparatus 1 according to the embodiment of the present invention will be described with reference to FIG. 1.

The LiDAR apparatus 1 may detect a detection target 2 on the basis of a time of flight (TOF) method or a phase-shift method using laser light as a medium, and may detect a position of the detected detection target 2, a distance to the detection target 2, a relative speed, and the like. To this end, the LiDAR apparatus 1 emits laser light, receives light reflected back from a surrounding target object, and images a distance to the object and a shape of the object.

The LiDAR apparatus 1 may be disposed at an appropriate position of an apparatus such as a vehicle or the like to detect the detection target 2. In an embodiment, the LiDAR apparatus 1 may be disposed on a front side, a rear side, or a lateral side of a vehicle.

In the illustrated embodiment, the LiDAR apparatus 1 includes a transmitter 10, a receiver 20, and a signal processing unit 30.

The transmitter 10 serves to emit laser light to a periphery of the LiDAR apparatus 1, and the receiver 20 serves to receive laser light reflected back from the detection target 2. The signal processing unit 30 processes signals for the laser light of the transmitter 10 and the receiver 20.

The transmitter 10, the receiver 20, and the signal processing unit 30 are electrically connected to each other. Accordingly, the signal processing unit 30 may include a process of processing a received signal and generating data for the detection target 2 on the basis of the processed signal. In this case, the signal processing unit 30 may calculate a separation distance to the detection target 2 or the like by collecting and processing data for corresponding light.

In an embodiment, the signal processing unit 30 may convert an output signal detected by a detection unit of the receiver 20 into a voltage and amplify the voltage, and then convert the amplified voltage into a digital signal using an analog-to-digital convertor (ADC).

Hereinafter, the transmitter 10 will be described in more detail with reference to FIG. 2.

In the illustrated embodiment, the transmitter 10 includes a transmission optical module 11 and a transmitter lens 12.

The transmission optical module 11 emits laser light toward the detection target 2.

The transmission optical module 11 may generate laser light having the same wavelength or different wavelengths. In an embodiment, the transmission optical module 11 may generate laser light having a wavelength of about 905 nm.

In an embodiment, the transmission optical module 11 may be implemented using a small-sized, low-power semiconductor laser diode. However, the present invention is not limited thereto, and the transmission optical module 11 may be formed in any structure that can generate laser light.

The transmitter lens 12 is disposed between the transmission optical module 11 and the detection target 2.

The transmitter lens 12 serves as a path that connects the transmission optical module 11 to the periphery to allow light to pass therethrough. The laser light emitted from the transmission optical module 11 is transmitted through the transmitter lens 12 and then travels to the periphery of the LiDAR apparatus 1. In the above process, the transmitter lens 12 adjusts a path of the laser light incident from the transmission optical module 11.

In the illustrated embodiment, the transmitter lens 12 includes a transmitter glass 121 and a transmitter absorbing coating layer 122.

The transmitter glass 121 is formed to have a transmittance sufficient for transmitting laser light. Further, the transmitter glass 121 is formed to have a refractive index greater than 1. In an embodiment, the transmitter glass 121 is formed to have a refractive index of 1.5.

In the illustrated embodiment, the transmitter glass 121 extends along a plane perpendicular to a traveling direction of light. However, a shape of the transmitter glass 121 is not limited to the illustrated shape, and the transmitter glass 121 may be formed in any of various shapes. For example, the transmitter glass 121 may extend along a curved surface having a curvature corresponding to a measurement angle of the LiDAR apparatus 1.

The transmitter absorbing coating layer 122 is coupled to one surface of the transmitter glass 121.

The transmitter absorbing coating layer 122 absorbs some scattered light of the laser light transmitted through the transmitter glass 121 and thus allows the scattered light to be reduced.

One surface of the transmitter glass 121 is coated with the transmitter absorbing coating layer 122. In the illustrated embodiment, the one surface is a surface of the transmitter glass 121 facing the transmission optical module 11. However, a position of the transmitter absorbing coating layer 122 is not limited thereto. For example, the one surface may be a surface of the transmitter glass 121 opposite to the transmission optical module 11.

In the traveling direction of the laser light, a cross-sectional area of the transmitter absorbing coating layer 122 is identical to or larger than a transmission area of the laser light with respect to the transmitter absorbing coating layer 122. In this case, the transmission area of the laser light with respect to the transmitter absorbing coating layer 122 is a transmission area of an inner surface of the transmitter absorbing coating layer 122, that is, a transmission area of one surface of the transmitter absorbing coating layer 122 facing the transmission optical module 11. In an embodiment, the cross-sectional area of the transmitter absorbing coating layer 122 may be larger than the transmission area of the laser light by 10% or more.

In an embodiment, a central part of the transmitter absorbing coating layer 122 may be positioned on an imaginary line that connects a starting point of the laser light to a central part of the transmitter glass 121.

The transmitter absorbing coating layer 122 is formed of an absorbent material that can absorb energy of the laser light. In this case, an absorption wavelength band may be designed in consideration of a wavelength of the light, a transmission wavelength of the transmitter glass 121, a reaction wavelength of the detection target 2, and the like.

In an embodiment, in a LiDAR apparatus that includes a bandpass filter 224 and generates laser light having a wavelength of 905 nm, an absorption wavelength band of the transmitter absorbing coating layer 122 may be 850 nm or more.

In another embodiment, in a LiDAR apparatus that does not include the bandpass filter 224 and generates laser light having a wavelength of 905 nm, a minimum value of an absorption wavelength band of the transmitter absorbing coating layer 122 may be smaller than 850 nm.

Some scattered light of the laser light may be absorbed and thus the scattered light may be reduced in a process in which the laser light is transmitted through the transmitter absorbing coating layer 122. Accordingly, the scattered light generated inside the transmitter lens 12 can also be reduced.

Furthermore, since detected noise of internal light can be reduced, a minimum distance between the LiDAR apparatus 1 and the detection target 2, which is required for detection, can be further reduced. That is, the minimum detection distance performance of the LiDAR apparatus 1 can be further improved.

The laser light generated by the transmitter 10 may be reflected from the detection target 2 and then incident on the receiver 20.

Hereinafter, the receiver 20 will be described in more detail with reference to FIGS. 3 to 6.

FIG. 3 illustrates a receiver 20 according to an embodiment of the present invention. In the embodiment illustrated in FIG. 3, the receiver 20 includes a reception optical module 21 and a receiver lens 22.

The reception optical module 21 receives laser light passing through the receiver lens 22 and converts the received laser light into a signal such as a current or the like.

In an embodiment, the reception optical module 21 may convert light reflected and received from the detection target 2 into an electrical signal such as a current or the like using a photoelectric conversion element such as a photodiode or the like. However, the reception optical module 21 is not limited thereto, and the reception optical module 21 may be formed in any structure that can receive laser light and convert the received laser light into a signal.

The receiver lens 22 is disposed between the reception optical module 21 and the detection target 2.

The receiver lens 22 serves to reduce scattered light of the laser light incident on the reception optical module 21 and transmit light waves having only the wavelength to be used. Laser light reflected back from the detection target 2 is transmitted through the receiver lens 22 and then incident on the reception optical module 21. In the above process, the receiver lens 22 adjusts a path of the laser light incident on the reception optical module 21.

In the illustrated embodiment, the receiver lens 22 includes a receiver glass 221, a receiver absorbing coating layer 222, and an anti-reflecting (AR) coating layer 223.

The receiver glass 221 is formed to have a transmittance sufficient for transmitting laser light. Further, the receiver glass 221 is formed to have a refractive index greater than 1. In an embodiment, the receiver glass 221 is formed to have a refractive index of 1.5.

In the illustrated embodiment, the receiver glass 221 extends along a plane perpendicular to a traveling direction of light. However, a shape of the receiver glass 221 is not limited to the illustrated shape, and the receiver glass 221 may be formed in any of various shapes. For example, the receiver glass 221 may extend along a curved surface having a curvature corresponding to a measurement angle of the LiDAR apparatus 1.

The receiver absorbing coating layer 222 is coupled to one surface of the receiver glass 221.

The receiver absorbing coating layer 222 absorbs some scattered light of the laser light transmitted through the receiver glass 221 and thus allows the scattered light to be reduced.

One surface of the receiver glass 221 is coated with the receiver absorbing coating layer 222. In the illustrated embodiment, the one surface is a surface of the receiver glass 221 facing the detection target 2. However, a position of the receiver absorbing coating layer 222 is not limited thereto. For example, the one surface may be a surface of the receiver glass 221 opposite to the detection target 2.

In the traveling direction of the laser light, a cross-sectional area of the receiver absorbing coating layer 222 is identical to or larger than a transmission area of the laser light with respect to the receiver absorbing coating layer 222. In this case, the transmission area of the laser light with respect to the receiver absorbing coating layer 222 is a transmission area of an outer surface of the receiver absorbing coating layer 222, that is, a transmission area of one surface of the receiver absorbing coating layer 222 facing the detection target 2. In an embodiment, the cross-sectional area of the receiver absorbing coating layer 222 may be larger than the transmission area of the laser light by 10% or more.

In an embodiment, a central part of the receiver absorbing coating layer 222 may be positioned on an imaginary line that connects the detection target 2 to a central part of the receiver glass 221. In another embodiment, the position of the receiver absorbing coating layer 222 may be determined through ghost image analysis.

The receiver absorbing coating layer 222 is formed of an absorbent material that can absorb energy of the laser light. In this case, an absorption wavelength band may be designed in consideration of a wavelength of the light, a transmission wavelength of the receiver lens 22, a reaction wavelength of the detection target 2, and the like.

Therefore, some scattered light of the laser light may be absorbed and thus the scattered light may be reduced in a process in which the laser light is transmitted through the receiver absorbing coating layer 222. Furthermore, since the number of signals finally detected by the receiver 20 is also reduced, a greater number of signals may be incident on the same receiver 20. That is, it is possible to process more signals.

Further, the AR coating layer 223 is disposed on one side of the receiver lens 22.

The AR coating layer 223 serves to improve a transmittance of the laser light of the entire receiver lens 22.

In the illustrated embodiment, the AR coating layer 223 is disposed on one surface of the receiver absorbing coating layer 222 facing the detection target 2 and on one surface of the receiver glass 221 facing the reception optical module 21.

However, the AR coating layer 223 is not limited to the illustrated structure and may be formed in any of various configurations. In an embodiment, the AR coating layer 223 may be disposed on either of one surface of the receiver absorbing coating layer 222 facing the detection target 2 and one surface of the receiver glass 221 facing the reception optical module 21. In another embodiment, the AR coating layer 223 may be omitted.

The AR coating layer is composed of a plurality of layers having a refractive index that is greater than 1 and smaller than a refractive index of the receiver glass 221. Accordingly, a reflectivity of the laser light transmitted through the receiver lens 22 can be reduced, and a transmittance of the laser light can be increased. A detailed description thereof will be given below.

The receiver 20 according to one embodiment of the present invention has been described above. Hereinafter, a receiver 20 according to another embodiment of the present invention will be described with reference to FIG. 4.

The receiver 20 according to the present embodiment corresponds to the receiver 20 according to the above-described embodiment in function and structure. However, the receiver 20 according to the present embodiment is different from the receiver 20 according to the above-described embodiment in some components.

Specifically, the receiver 20 according to the present embodiment is different from the receiver 20 according to the above-described embodiment in that a bandpass filter 224 is provided on one surface of the receiver glass 221 facing the reception optical module 21.

Hereinafter, the receiver 20 according to the present embodiment will be mainly described with focus on differences from the receiver 20 according to the above-described embodiment.

The receiver 20 according to the present embodiment includes a reception optical module 21 and a receiver lens 22.

Among the components, the reception optical module 21 has the same structure, function, and combination structure as the reception optical module 21 according to the above-described embodiment.

The receiver lens 22 has substantially the same structure and function as the receiver lens 22 according to the above-described embodiment. However, the receiver lens 22 according to the present embodiment is different from the receiver lens 22 according to the above-described embodiment in that the bandpass filter 224 is provided on one surface of the receiver lens 22 facing the reception optical module 21.

The receiver lens 22 includes a receiver glass 221, a receiver absorbing coating layer 222, an AR coating layer 223, and a bandpass filter 224.

Among the components, the receiver glass 221 and the receiver absorbing coating layer 222 have the same structure, function, and combination structure as the receiver glass 221 and the receiver absorbing coating layer 222 according to the above-described embodiment.

The AR coating layer 223 is different from the AR coating layer 223 according to the above-described embodiment in that the AR coating layer 223 is not disposed on one surface of the receiver glass 221 facing the reception optical module 21 and is disposed only on one surface of the receiver absorbing coating layer 222 facing the detection target 2.

The bandpass filter 224 transmits only light waves within a preset wavelength range, thereby reducing scattered light transmitted through the receiver lens 22.

One surface of the receiver glass 221 is coated with the bandpass filter 224. In the illustrated embodiment, the bandpass filter 224 is disposed on one surface of the receiver glass 221 facing the reception optical module 21.

In the traveling direction of the laser light, a cross-sectional area of the bandpass filter 224 is identical to or larger than a transmission area of the laser light with respect to the bandpass filter 224. In this case, the transmission area of the laser light with respect to the bandpass filter 224 is a transmission area of one surface of the bandpass filter 224 facing the detection target 2.

In an embodiment, a central part of the bandpass filter 224 may be positioned on an imaginary line that connects the detection target 2 to a central part of the receiver glass 221.

The bandpass filter 224 is formed of an absorbent material that can absorb energy of the laser light. Further, the bandpass filter 224 transmits only light waves within a preset wavelength range. In an embodiment, the preset wavelength range may be 200 nm or more and 1,200 nm or less.

Accordingly, scattered light of the laser light passing through the bandpass filter 224 may be reduced. A detailed description thereof will be given below.

The receiver 20 according to an embodiment of the present invention and the receiver 20 according to another embodiment have been described above. However, the receiver 20 is not limited to the above embodiments.

In still another embodiment, the receiver 20 may separately include a bandpass filter 224 disposed on one side of the receiver 20 facing the detection target 2. In the bandpass filter 224, since a change in wavelength according to an angle of incidence is insignificant, the bandpass filter 224 may be disposed as close to the detection target 2 as possible in consideration of minimization of a transmission area of the laser light. In the above embodiment, an absorption wavelength band of the receiver absorbing coating layer 222 may be designed to be wider.

Hereinafter, a process in which the laser light passes through the receiver lens 22 will be described in more detail with reference to FIGS. 5 and 6.

FIG. 5 illustrates a process in which the laser light is transmitted through the receiver glass 221 and the AR coating layer 223.

As described above, the AR coating layer 223 is composed of a plurality of layers having a refractive index that is greater than 1 and smaller than a refractive index of the receiver glass 221. Accordingly, the laser light may be gradually refracted in the process in which the laser light is transmitted through the AR coating layer 223. As a result, a transmittance of the laser light at an interface of the receiver glass 221 can be increased, and a reflectivity thereof can be reduced.

FIG. 5A is a side cross-sectional view of the receiver glass 221 and the AR coating layer 223 in a state in which the laser light is transmitted therethrough, and FIG. 5B illustrates a phase change of the laser light according to the receiver glass 221 and the AR coating layer 223.

The laser light transmitted through the receiver glass 221 and the AR coating layer 223 may be re-reflected at ① a time point of incidence on the AR coating layer 223, ② a time point of incidence on the receiver glass 221, ③ a time point at which the laser light enters the air from the receiver glass 221, and ④ an interface between the receiver glass 221 and the AR coating layer 223, and then reflected and returned at a time point such as a time point when the laser light is reflected back at the interface between the receiver glass 221 and the air or the like.

In the above process, a transmittance of the laser light of the receiver glass 221 can be reduced, and a misdetection phenomenon can be caused by the reflected laser light.

In order to solve such a problem, the AR coating layer 223 is designed so that a length of the reflected light path is an odd multiple of ¼ of the wavelength, and thus may be designed so that the wavelengths of the reflected light have a phase difference of ½ from each other. This is to overlap and offset the reflected light.

FIGS. 6A and 6B illustrate states before and after reduction of the scattered light of the laser light transmitted through the receiver lens 22. Hereinafter, "main signal" refers to a signal detected in a preset target channel.

The scattered light of the laser light transmitted through the receiver lens 22 or a shift phenomenon according to an angle of incidence may allow a signal to be generated in a channel other than the preset target channel. Accordingly, a misdetection phenomenon in which a virtual image is detected by a signal other than the main signal may occur (see FIG. 6A).

On the other hand, since the receiver lens 22 according to the present invention reduces the scattered light generated in the transmission process of the laser light, the signal generated in the channel other than the preset target channel can be reduced (see FIG. 6B).

Accordingly, it is possible to more easily distinguish the main signal from the remaining signals. As a result, the misdetection phenomenon caused by the scattered light can be reduced. Furthermore, a threshold voltage value serving as a detection criterion of the receiver 20 can be further reduced, and a maximum detection distance of the LiDAR apparatus 1 may be further improved.

Further, the shift phenomenon of the transmission wavelength according to the angle of incidence of the laser light may be prevented. That is, an influence of the LiDAR apparatus 1 according to a change in the angle of incidence of the laser light can be reduced. Accordingly, when the receiver lens 22 according to the present invention is applied to a LiDAR apparatus 1 of a wild field of view (FoV), a difference in detection distance according to the FoV can be more reduced.

In addition, since the bandpass filter 224 is not affected by the angle of incidence of the laser light, it is easier to design a lens including the bandpass filter 224, and it is possible to reduce the number of manufacturing processes and further reduce the manufacturing cost.

Among various effects of the present invention, effects that can be obtained through the above-described solution are as follows.

First, the LiDAR apparatus includes a transmitter configured to emit laser light toward a detection target and a receiver configured to receive laser light reflected back from the detection target. The transmitter and the receiver include a transmitter lens and a receiver lens, respectively.

Laser light is transmitted through each of the transmitter lens and the receiver lens. In this case, an interface of each of the transmitter lens and the receiver lens on which the laser light is incident is coated with an absorbing coating layer. The absorbing coating layer is formed of an absorbent material that absorbs energy of the laser light.

Further, the AR coating layer composed of a plurality of layers having a refractive index that is greater than 1 and smaller than a refractive index of the receiver glass is disposed on one side of the receiver lens. In addition, the receiver includes a bandpass filter that is disposed on one side of the receiver facing the detection target, formed of an absorbent material, which absorbs energy of the laser light, and transmits only light waves within a preset wavelength range.

Therefore, the scattered light can be reduced by the absorbing coating layer. Accordingly, a minimum distance between the LiDAR apparatus and the detection target, which is required for detection, can be further reduced. That is, the minimum detection distance performance of the LiDAR apparatus can be further improved.

In addition, the scattered light transmitted through the receiver lens can be reduced by the AR coating layer and the bandpass filter. Accordingly, a misdetection phenomenon in which a virtual image is detected by the scattered light can be reduced.

Further, the scattered light transmitted through the receiver lens is reduced, and thus misdetection of the scattered light having a detectable signal level is also prevented.

Therefore, a threshold voltage value serving as a detection criterion of the receiver can be reduced. Accordingly, a maximum detection distance of the LiDAR apparatus can be further improved.

Further, as described above, since the receiver includes a bandpass filter, a wave change of the laser light generated when the laser light is incident at an angle of incidence within a specific range can be reduced.

Therefore, an influence of the LiDAR apparatus according to a change in the angle of incidence of the laser light can be reduced. Furthermore, when the receiver lens according to the present invention is applied to a LiDAR apparatus of a wild FoV, a difference in detection distance according to the FoV can be more reduced.

Further, as described above, since the scattered light transmitted through each lens of the transmitter and the receiver is reduced by the absorbing coating layer, the number of signals finally detected by the receiver is also reduced.

Therefore, a greater number of signals can be incident on the same receiver. That is, it is possible to process more signals.

Further, the bandpass filter is not affected by the angle of incidence of the laser light.

Therefore, it is easier to design a lens including the bandpass filter, and it is possible to reduce the number of manufacturing processes and further reduce the manufacturing cost.

Although the present invention has been described with reference to exemplary embodiments of the present invention, the present invention is not limited to the configurations of the above-described embodiments.

Further, the present invention may be variously modified and changed by those skilled in the art to which the present invention pertains without departing from the spirit and scope of the present invention as defined by the appended claims.

Furthermore, some or all of the embodiments may be selectively combined and implemented so that various modifications can be made.

What is claimed is:

1. A light detection and ranging (LiDAR) apparatus comprising:

a transmitter including a transmission optical module that emits laser light toward a detection target, and a transmitter lens through which the laser light emitted from the transmission optical module is transmitted; and a receiver including a receiver lens through which laser light reflected back from the detection target is transmitted and a reception optical module configured to receive the laser light passing through the receiver lens, wherein the transmitter lens includes:

a transmitter glass; and a transmitter absorbing coating layer that is formed of an absorbent material, which absorbs energy of the laser light, and with which one surface of the transmitter glass is coated, wherein the receiver lens includes:

a receiver glass;

a receiver absorbing coating layer that is formed of an absorbent material, which absorbs energy of the laser light, and that is disposed on one side of the receiver glass facing the detection target;

an anti-reflecting (AR) coating layer that is composed of a plurality of layers, which have refractive indices that are greater than 1 and smaller than a refractive index of the receiver glass, and that is disposed on one side of the receiver glass facing the reception optical module;

a bandpass filter that is disposed on one side of the receiver absorbing coating layer facing the detection target, formed of an absorbent material that absorbs energy of the laser light, and transmits only light waves within a preset wavelength range, wherein the transmission optical module emits the laser light having a wavelength of 900 nm to 910 nm, and wherein an absorption wavelength band of the transmitter absorbing coating layer is 850 nm or more.

2. The LiDAR apparatus of claim 1, wherein a cross-sectional area of the transmitter absorbing coating layer in a traveling direction of the laser light is identical to or larger than a transmission area of the laser light.

3. The LiDAR apparatus of claim 2, wherein a central part of the transmitter absorbing coating layer is positioned on an imaginary line that connects a starting point of the laser light to a central part of the transmitter glass.

4. The LiDAR apparatus of claim 2, wherein a cross-sectional area of the transmitter absorbing coating layer is larger than a transmission area of the laser light by 10% or more.

5. The LiDAR apparatus of claim 1, wherein the preset wavelength range is 200 nm or more and 1,200 nm or less.

6. The LiDAR apparatus of claim 1, wherein a cross-sectional area of the bandpass filter in a traveling direction of the laser light is identical to or larger than a transmission area of the laser light.

7. The LiDAR apparatus of claim 6, wherein the bandpass filter has a central part positioned on an imaginary line that connects the detection target to a central part of the receiver glass.

8. The LiDAR apparatus of claim 6, wherein a cross-sectional area of the receiver absorbing coating layer is larger than a transmission area of the laser light by 10% or more.

* * * * *